United States Patent [19]
Janeke

[11] 3,716,046
[45] Feb. 13, 1973

[54] APPARATUS AND METHOD FOR ROTATIONALLY INDUCING AND MEASURING NYSTAGMUS

[75] Inventor: Charles E. Jeneke, Brooklyn, Pretoria, Republic of South Africa

[73] Assignee: Tracoustics, Inc., Denver, Colo.

[22] Filed: April 27, 1971

[21] Appl. No.: 137,822

[52] U.S. Cl..................128/2.1 R, 250/50, 351/1, 351/38
[51] Int. Cl..............................A61b 5/04, A61b 3/00
[58] Field of Search..............351/1, 6, 7, 17, 39, 38; 250/50; 128/2.1 R

[56] References Cited
UNITED STATES PATENTS 3,258,008   6/1966   Vulliet-Durand..................128/2.1 R Primary Examiner—David Schonberg
Assistant Examiner—Paul A. Sacher
Attorney—Arnold, White & Durkee

[57] ABSTRACT

Apparatus and method for rotationally inducing nystagmus in the horizontal plane, the apparatus including a chair pivotal about an upward directed axis and biased to an at-rest position, tensioning of the biasing means and adjustable lateral weights providing means for damping the periodicity of the sinusoidal chair movement.

21 Claims, 5 Drawing Figures

PATENTED FEB 13 1973 3,716,046

Charl E. Janeke
INVENTOR

BY

Arnold, White & Durkee
ATTORNEYS

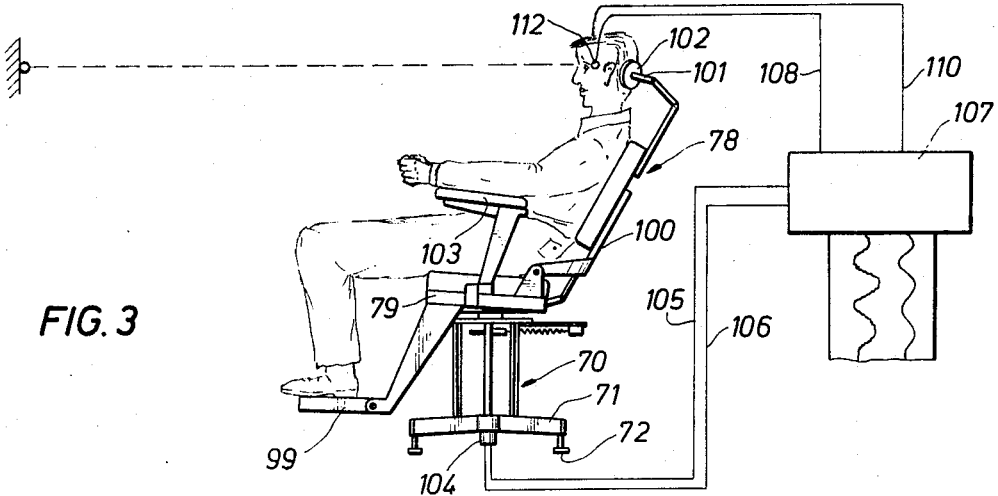
FIG. 3
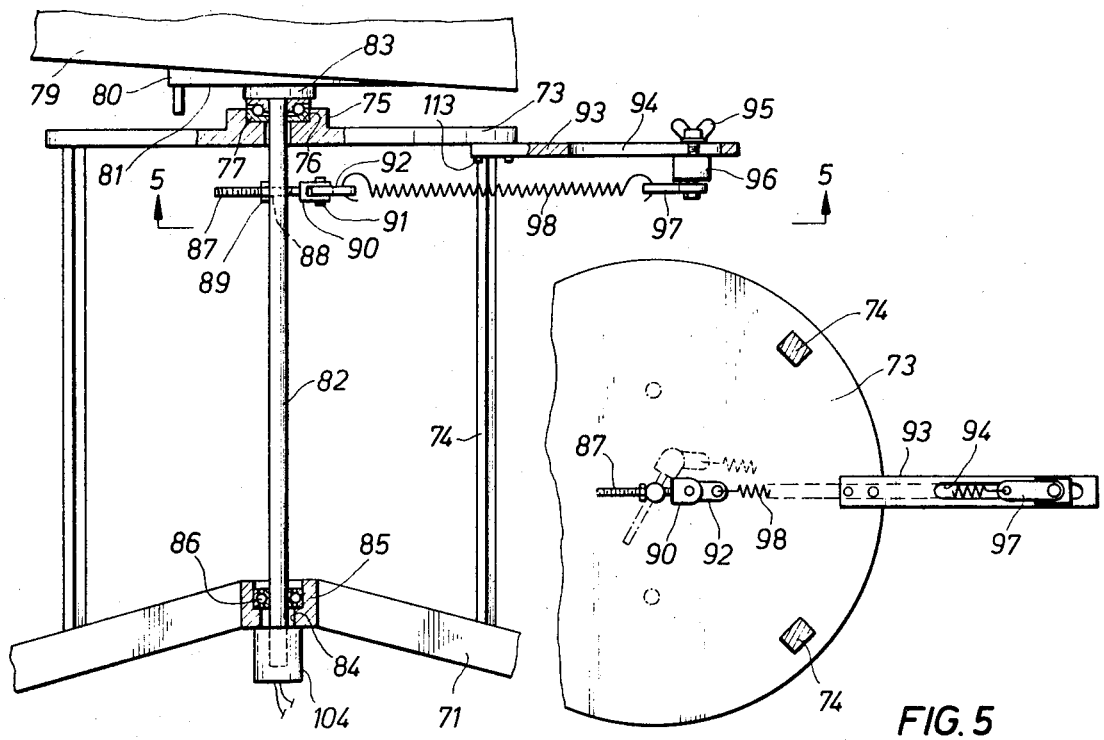
FIG. 4
FIG. 5
Charl E. Janeke
INVENTOR
BY
Arnold, White & Durkee
ATTORNEYS

APPARATUS AND METHOD FOR ROTATIONALLY INDUCING AND MEASURING NYSTAGMUS

FIELD OF THE INVENTION

This invention pertains to the provoking and measurement of nystagmus and more specifically to apparatus and procedure for more effectively inducing nystagmus in human subjects to produce more efficient and meaningful results than provided in the prior art.

DESCRIPTION OF THE PRIOR ART

Nystagmus is a term applied to a vestibular phenomenon of the canals on both sides of the head and manifests itself in a detectable, involuntary movement of the eyeballs under certain induced stimuli. Such movement is a rhythmical oscillation of the eyeballs either horizontal, rotary, or vertical. The measurement of eye movement is accomplished through the use of very sensitive electrodes or other sensors positioned in close proximity to the eyes. Even every minute movement of the eyes produces detectable impulses, which are then converted to electrical signals suitable for amplification and recording. The instrument of which such recordings are made is known as a nystagmograph.

The caloric test is typical of the prior art methods. In this test for vestibular functioning, the external auditory meatus is irrigated with either hot or cold water. If the vestibule is healthy, injection or irrigation into the external auditory canal of water below the body temperature (30° C. or lower) will cause rotary nystagmus toward the opposite side. When the injected fluid is above the body temperature (44° C. or higher), the nystagmus will be toward the injected side. If the labyrinth or other parts of the vestibular apparatus is diseased, the response fails relatively or entirely.

Other methods for inducing nystagmus in the prior art include electrical inducing, caloric inducing using gases (rather than water), and motion inducing. In each case, however, such prior art methods have proven defective either because of direct interference with the accuracy of the measurement or creating a variable response relating to physical characteristics of the subject not related to nystagmus.

For example, direct interference with electrical responses may occur when using the electrical inducing method. When using either a liquid or gas caloric test medium, the temperature shock may cause discomfort and subject response interfering with normal nystagmus testing. Even when no discomfort or pain at all is involved, the individual under examination is made more alert in readiness for the test, hence interfering with normal, non-alerted senses.

Motion inducing of nystagmus has proved successful by initiating an angular acceleration in the plane of the horizontal canals to produce in normal individuals a normal nystagmus in the horizontal plane. This nystagmus originates as local excitatory processes in both horizontal lateral semicircular canals. When the subject is blindfolded or told to keep his eye shut to prevent optokinetic stimulation and is put in easy oscillatory motion in the sitting position, nystagmus is induced with the minimum effects to external stimulation.

A primitive chair, known as the torsion chair, has been used to induce nystagmus, such chair including a torsion bar mounted to the ceiling to support the seat in which the subject sits. The chair is turned to one side twisting the bar to initiate the test. The chair is then released to cause movement which is damped as it rotates back and forth.

The torsion chair has a long oscillation damping time owing to the relatively large compliance of the bar as well as the mass of the chair. Damping changes even by adding weight have proven slight. Moreover, the torsion chair is a fixed structure and presents a physical obstacle in any room during periods of non-use.

Chairs can also be made to be electrically driven in a manner that would give satisfactory control in a "damping" sense. But such a chair would be heavy, present maintenance problems, and be cumbersome (having to have such things as slip rings, etc.).

Therefore, a feature of the present invention is to provide an improved apparatus suitable for inducing nystagmus by rotational stimulus, the movement of which can be closely controlled.

Another feature of the present invention is to provide an improved apparatus that avoids the complexities of an electric motor driven system for rotationally inducing nystagmus.

Yet another feature of the present invention is to provide an improved apparatus for minimizing the stimulation of other physical awarenesses while inducing nystagmus.

Still another feature of the present invention is to provide an improved versatile chair that can be used for positioning a subject for motion testing in a sitting position, for motion testing of canals with respect to various gravitational axes and for caloric testing, all with space-saving economy.

SUMMARY OF THE INVENTION

A preferred embodiment of the present invention comprises a chair mounted to a base or other support means for physical rotation, such base being preferably movable from place to place. The connection between base and chair is via a shaft and anti-friction bearings, the bearings having approximately the same coefficient of friction for subjects from children to mature adults. Affixed between the base and chair is a biasing means, such as an arm attached to a coil spring, for moving the chair to an at-rest position relative to the base. Changing the tension on the spring, such as by changing its connecting position, changes the damping period for oscillation. Alternatively, a leaf spring may be used as the biasing means. Also, laterally adjustable weights may be affixed to appropriate side rods, the sizes and locations of such weights changing the radius of gyration. The apparatus provides for development of nystagmographs at different setting of biasing and/or mass adjustment means. Electrical sensing means, such as provided by a potentiometer, may be used for sensing and recording the amount of deviation of the chair from the at-rest position thereof simultaneously with the development of the nystagmographs recording.

BRIEF DESCRIPTION OF THE DRAWINGS

So that the manner in which the above-recited features, advantages and objects of the inventions, as well as others which will become apparent, are attained and can be understood in detail, more particular description of the invention briefly summarized above may be had by reference to the embodiments thereof which are illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

In the drawings:

FIG. 1 is a schematic representation of a preferred embodiment of the present invention.

FIG. 2 is a schematic representation of an alternate embodiment of the present invention.

FIG. 3 is an elevational view illustrating an alternative embodiment of the present invention.

FIG. 4 is a fragmentary elevational view illustrating the chair support structure of FIG. 3 in greater detail.

FIG. 5 is a fragmentary sectional view of the present invention taken along line 5—5 in FIG. 4.

DESCRIPTION OF PREFERRED EMBODIMENTS

Figure 1:
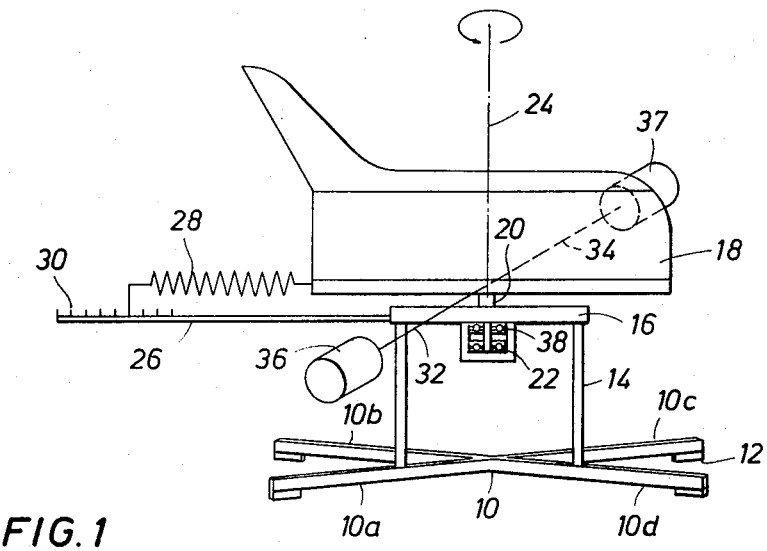

Now referring to the drawings and first to FIG. 1, a schematic representation of a preferred embodiment of the present invention is illustrated. The apparatus includes a support in the form of a base 10 comprised of four foot pieces 10a–10d. These four pieces are metal rods of substantially equal length having a rectangular cross section. The rods are connected in a common intersection, such as by welding, the base thus formed being a four-arm structure approximately parallel to the floor. An adjustable floor contact 12 is secured at the end of each foot piece to permit steadying and to compensate for unevenness of the floor wherever the apparatus is located. Also, if desired roller or caster apparatus may be incorporated into the foot pieces to facilitate transportation of the chair.

Welded to each of the foot pieces is an upstanding brace 14, the point of connection for each brace to its respective foot piece being the same radial distance from the common intersection.

Fixedly secured to the top of the four braces 14 is an elevated support 16 substantially horizontal to the floor. Alternatively, a single cylinder (not shown) may be used to carry support 16 in lieu of braces 14. Seat or chair 18, occupied by the human subject during test operation, is supported by support 16 by the use of a rod 20 fixedly secured to the underside of the seat and depending downward through a center opening in support 16 into receiving anti-friction thrust bearing 22 concentrically connected with its center opening by support 16. Rod 20 and bearing 22 permit pivotal rotation of seat 18 about upwardly extending axis 24. The rod and thrust bearings location may be reversed, if desired, the bearings being located on the underneath side of the seat and the rod fixedly attached to support 16, the rod upwardly extending therein. Also, the thrust bearings should have approximately the same coefficient of friction for thrust forces over a range of normal test subjects. Since children as well as adults may be tested, the coefficient should be approximately equal for weights from 50–250 pounds. Of course, test results may be compensated if any particular subjects weighs an amount outside that range.

In the embodiment illustrated in FIG. 1, and arm 26, fixedly attached to support 16, extends transversely to axis 24. This arm is preferably horizontal and extends some distance beyond the limits of the chair. Biasing means in the form of spring 28 is fixedly secured to the back of seat 18 (or to a central cylinder connected to the chair, when such a structure is used) and releasably connected to a connecting point 30 on arm 26. Connection may conveniently be through a snap-hook-and-eye arrangement. There are conveniently a number of connecting points 30 located along arm 26 at differing radial distances from axis 24. The tension placed on spring 28 is determined by which connecting point is used for attachment. Spring 28 biases or urges the seat to an at-rest location where spring 28 is located directly over arm 26.

Projecting transversely from the sides of chair 16 are rods 32 and 34, these rods projecting preferably horizontal with respect to the floor, at right angles to arm 26 and at a 180° angle to each other. A lateral weight 36 having an appropriate bore formed axially thereof is slidingly received by rod 32 and secured in place via a set screw or some other convenient means. Similarly, a weight 37 is slidingly received by rod 34 and secured in place. By loosening and resetting the set screw, weights 36 and 37 may be positioned at adjustable radial distance locations from axis 24 along rod 32 and 34, respectively. When their location settings are coordinated, weights 36 and 37 maintain spinning balance of the chair, but change the radius of gyration thereof for a purpose to be subsequently explained. Alternatively, a weight or weights may be incorporated directly into the chair framework. Lighter or heavier weights can also be changed to modify the rotating mass.

Seat 18, preferably includes a bottom portion, two arm rests and an adjustable headrest. Additionally, by means not shown in FIG. 1, the headrest is preferably made adjustable reclining to at least 45°.

A circular potentiometer 38, having its resistance element connected to support 16 around shaft 20, operates in conjunction with a movable arm connected to the shaft. Preferably, the resistance element is linear with distance. The variable resistance measurements provide electric-sensing position determination of the chair. By appropriate metering it is possible to determine not only how many times the chair swivels one way or the other from the at-rest position, but also how far the chair swivels. Velocity of chair gyrations is, of course, determined by the extent of pivotal movement in either direction beyond the at-rest position since the periodicity of gyrations will remain constant regardless of the extent of such pivotal movement.

In operation, the apparatus is placed at some convenient location and the human subject is seated comfortably in the seat. Connections are made to the subject for the nystagmographic measurements and to the potentiometer for measuring the chair position. The test is then performed by manually swiveling or displacing the chair from the at-rest position by a predetermined amount. Typically, the amount of deviation for the first rotation is a total of 270° or 135° either side of the at-rest position. The chair is then released and allowed to oscillate around the at-rest position until it gradually comes to a stop. The subject may be blind- 34. The sensing means 38 is set to the maximal load of the sawblade 4, and to the corresponding load of motor 5 in such a manner that the control valve 34 is shifted from the illustrated normal position by the pulse generator, not shown, to the control position when the set maximum load of drive motor 5 is exceeded, and sensed by sensing means 38. Consequently, at a selected maximum load and load torque, the hydraulic motor 32 rapidly operates the regulating member 21 to reduce the cross section of the regulating throttle 20, so that the feeding speed of the saw blade 4 is reduced. Due to the reduction of the feeding speed of saw blade 4, the load torque of motor 5 is immediately reduced, so that control valve 34 is shifted under the control of the load torque responsive means 38 and the pulse generator, not shown, to the initial position so that regulating member 21 is operated by the hydraulic control piston cylinder means 32 to adjust the regulating throttle to a higher feeding speed, the adjustment being slow due to the effect of throttle 37.

As shown in FIGS. 3 and 4, two manually settable stops 41 and 42 are provided which limit the range of adjustment of regulating member 21, and thereby of the regulating throttle 20 to predetermined maximum and minimum feeding speeds. Regulating member 21 has a projecting nose 43 which cooperates in the illustrated normal position of the handle 44 with the settable stops 41 and 42. When regulating member 21 is turned to a position abutting stop 41 or to a position abutting stop 42 by the control piston and cylinder means 32, the piston and piston rod 31 may continue its movement due to the provision of a slip clutch 29 between the piston rod 31 and its connecting link 30 and the regulating member 21.

The use of the stops 41 and 42 has the advantage that the regulating member 21 can be automatically moved only between two position, associated with maximum and minimum feeding speed of the saw blade 4, while farther movements of regulating member 21 and unnecessary adjustment times are eliminated.

In certain cases it may be advantageous to set the regulating member 21 manually by handle 44 to angular positions beyond the limits provided by stops 41 and 42. Handle 44 is then pressed down against the action of the spring 45 so that nose 43 is raised to a position passing over the set stops 41 and 42. In the normal position of FIG. 4, nose 43 moves along a circular path in which the stops 41 and 42 are located.

The above-described embodiment of the invention is particularly suitable when the sawing machine is provided with a hydraulic feeding means for the sawblade, so that pressure fluid is available. For sawing machines in which the feeding movement of the sawblade is not obtained by a hydraulic motor, it may be advantageous to connect the torque responsive sensing means 38 with the regulating member 21 by an electric stepping motor, not shown.

FIG. 6 illustrates a preferred electric circuit for connecting the torque responsive amperemeter 38 with the electromagnetic operating means 34a of the reversing control valve 34.

The electric drive motor 5 is a three-phase motor connected to three lines 74a, 74b, 74c. In the line 74c, three different transformers 57, 58 and 59 are connected, each of which has two windings so that each winding induces a corresponding current in the other winding. The three transformers 37, 38, and 39 are selected for setting three different rotary speeds of motor 5, and three different cutting speeds of the sawblade 4. The three different cutting speeds are diagrammatically indicated at I, II and III in FIG. 6.

A switching means 60 is connected with the transformers 57, 58, 59, and with the amperemeter 38, so that the latter can be connected by operation of the manual member 61 to anyone of the three transformers 57, 58, 59. The change of the rotary speed of the sawblade 4 can be effected electrically or by means of a motor. In a sawing machine of this type which has several cutting speeds, it is possible to obtain automatically, upon shifting to another cutting speed, a variation of the respective value sensed by sensing means 38 at the same torque, which is accomplished by selecting one of the transformers 37, 38, 39 for connection with the sensing amperemeter 38.

As shown in FIG. 6, the amperemeter 38 has a movable indicator pointer 62 which indicates the load acting on motor 5. By the three transformers 57, 58, 59, the currents occurring at three different speeds and indicated by amperemeter 38, are varied in such a manner that the indicating pointer 62 indicates the torque of the sawblade directly at a corresponding graduated scale 62d.

A maximum limit marking member 66 can set by means of a hand wheel 67 on amperemeter 38. When the indicator member 62 reaches this limit marking member 66, the relay 69 is actuated so that the relay 71 is energized and closes contact 71/2 so that electromagnetic means 34a operates the reversing control valve 34 so that the pressure liquid can flow through the check valve 40 into cylinder chamber 36, and effect fast closing of the regulating throttle 20. In this manner, the feeding speed of the saw blade is quickly reduced so that indicator pointer 62 is moved to indicate the corresponding reduced load of motor 5.

When the other limit marking member 64, set by the handwheel 65, is reached by the indicator pointer 38, relay 68 is actuated, so that its contact energizes relay 71 again whereby the electromagnetic means 34a of the reversing control valve 34 is shifted. This has the effect that the control means 32, 34 slowly open the regulating throttle 20 so that the feeding speed of the saw blade is slowly increased until indicator pointer 62 reaches the maximum limit marking member 66 again.

It should be noted that the manually operated switch 70 can be operated to eliminate the above-described automatic regulation of the feeding speed by amperemeter 38, if operational conditions make this advisable. The contacts 71/1 and 71/2 of relay 71 are actually located within the housing of the relay 71.

While the indicator pointer 62 may be mechanically cooperate with limit marking members 66 and 64, it is possible to obtain the required electrical control signals by an inductive connection between the limit marking members 64 and 66 and the indicator pointer 62. For example, members 64 and 66 may be provided with windings producing a magnetic field which is disturbed by indicator pointer 66 when moving into close proximity with members 64 or 66, which may be U-shaped to increase the force of the respective magnetic field. Instead of mechanical contact between indicator pointer 62 and the limit marking members 64 and 66, a light barrier and photocells may be used.

In the circuit illustrated in FIG. 6 a circuit part to which indicator pointer 62 and limit marking members 64, 66 are connected, has conductor bars connected with a suitable source of electric voltage. Other connector bars, 75 are connected with another voltage source having a different voltage, and supply the current for the operation of the electromagnetic means 34a of the reversing control valve 34.

Figure 2:
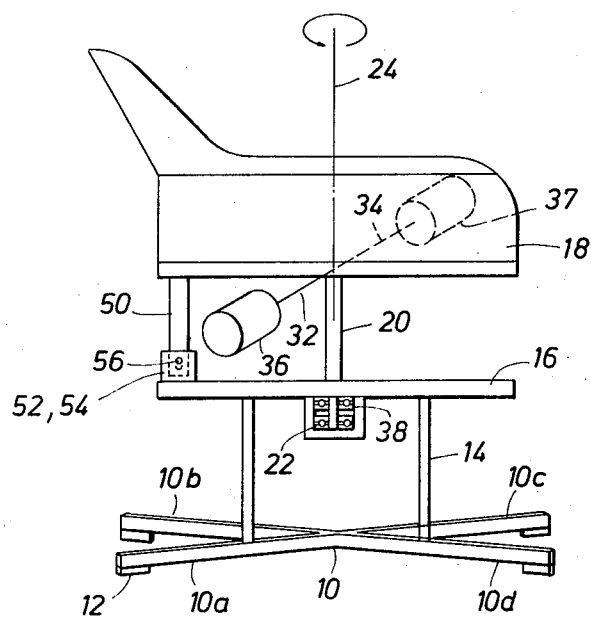

It will be understood that the electric circuit illustrated in FIG. 6 is schematically indicated by dash and dot lines and amperemeter 38 in FIG. 2. FIGS. 2 and 6 together constitute a preferred embodiment of the invention.

The above-described apparatus has the effect that the regulating means 21, 20 are operated by the control means 32, 34 to effect a slow increase of the feeding speed, as long as the maximum permissible load torque has not been reached at the drive motor 5. When this condition is sensed by the amperemeter 38, control piston means 31 presses the operating liquid out of control chamber 36 and through throttle 37, so that it is possible to adjust the speed of this movement by adjusting throttle 37. When a feeding speed is reached at which the saw blade 4 produces the maximum permissible load, the control means 32, 34 are shifted so that control piston 31 moves rapidly while reducing the volume of pressure chamber 33 through the free return conduit 35, in which no throttle is provided. As a result, the load on the saw blade 4 is reduced, which causes a shifting of control valve 34 and again a gradual increase of the feeding speed of the saw blade.

The apparatus of the invention is very sensitive, so that control piston 31 performs only very small movements substantially in the range of the maximum feeding speed.

The regulating member 21 can be provided with a graduated scale, shown in FIG. 3, for indicating the feeding speed of the sawing blade.

Irrespective of the function of the torque responsive amperemeter 38, the manually settable stops 41 and 42 limit the feeding speed which can vary only between a maximum feeding speed and a minimum feeding speed, determined by manually setting the stops 41 and 42. By the provision of a minimum feeding speed stop, the feeding speed cannot be rapidly reduced to a lower value than is necessary.

FIGS. 5a and 5 show diagrammatically an operation of the saw blade under the control of the apparatus of the invention. In FIG. 5a, the sawblade 4 is shown in several positions 51 to 56 assumed while being fed by feeding means 22, 11. A I-profile is being cut. As shown in FIG. 5a, in the position 51 of saw blade 4, the length of the cut surface engaged by the teeth of the saw blade is very small, so that it is possible to operate at a maximum feeding speed and with a maximum depth of cut and thickness of the chips. In the position 52, the sawblade engages the web of the bar 59 so that the load torque acting on the sawblade drive is rapidly increased until the set maximum value is reached. In the manner described with reference to FIG. 2, the feeding speed is rapidly reduced and then slowly rises as indicated at 53 in FIG. 5 until the set maximum speed is obtained, which causes again a reduction of the feeding speed.

The same adjustments are obtained when the sawing blade 4 is in the position 54, while in the position 55 in which the sawblade teeth move out of the web of bar 59, see FIG. 5a, a higher feeding speed is possible which is then once reduced. In the meantime, the sawblade arrives in the position 56, so that the feeding speed can rise to the maximum speed at which the operation was started in the position 51 of the sawblade 4.

It will be understood that each of the elements described above, or two or more together, may also find a useful application in other types of feed control apparatus for rotary tools differing from the types described above.

While the invention has been illustrated and described as embodied in a feeding speed control apparatus for a rotary saw blade having manually settable means for limiting the feeding speed between a maximum and a minimum desired for a workpiece, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Feed control apparatus for a rotary tool, comprising a motor means for rotating the tool; feeding means for feeding the tool into a material; regulating means connected with said feeding means for controlling the feeding speed of said tool and including a movable regulating member; control means connected with said regulating means and having a normal position for operating said regulating means to slowly increase the feeding speed, and a control position for operating said regulating means to rapidly reduce the feeding speed; torque responsive sensing means for sensing the load torque acting on said motor means and connected with said control means for setting the same to said control position when sensing a maximum load torque so that said regulating means rapidly reduces the feeding speed and thereby said load torque until said sensing means sets at a minimum load torque said control means back to said normal position; and first and second manually settable stops for limiting movement of said regulating member independently of said control means and sensing means in two positions in which said regulating means sets said feeding means to a maximum feeding speed and to a minimum feeding speed, respectively, selected for a specific workpiece by setting said stops, so that said regulating member moves rapidly toward said second stop for obtaining minimum feeding speed and slowly toward said first stop for obtaining maximum feeding speed.

2. Feed control apparatus as claimed in claim 1 wherein said control means include a movable control a seat including means for being freely pivotally mounting said seat for oscillatory movement on said support means about an upwardly directed axis, and biasing means affixed to said seat for urging said seat to an at-rest position whenever said seat is pivoted in either direction therefrom.

2. Apparatus as described in claim 1, wherein one of said seat and support means includes a shaft and the other of said seat and support means includes an antifriction thrust bearing for receiving said shaft.

3. Apparatus as described in claim 2, wherein said thrust bearing has substantially the same functional coefficient of friction for a wide range of thrust forces.

4. Apparatus as described in claim 1, wherein said support means includes floor contacts for stabilizing said apparatus on uneven floor.

5. Apparatus for including nystagmus in a human subject, comprising:
support means,
a seat including means for freely pivotally mounting said seat for oscillatory movement on said support means about an upwardly directed axis,
an arm connected to said seat and projecting transversely to said axis, and
a spring connected to said arm and said support means for biasing said seat to an at-rest position with respect to said support means whenever said seat is pivoted in either direction therefrom.

6. Apparatus as described in claim 5, wherein said spring is connected to said support means at a greater radial distance from said axis than the connection of said spring to said arm.

7. Apparatus for inducing nystagmus in a human subject, comprising:
support means,
a seat including means for freely pivotally mounting said seat for oscillatory movement on said support means about an upwardly directed axis,
biasing means urging said seat to an at-rest position whenever said seat is pivoted in either direction therefrom, and
means for damping the time of oscillation when said seat is moved from the at-rest position and allowed to oscillatorily freely pivot.

8. Apparatus as described in claim 7, wherein said damping means includes at least two arms extending transversely to said axis having weights adjustably positional therealong for modifying the radius of gyration of said pivoted seat.

9. Apparatus as described in claim 8, wherein said two arms extend from said axis 180° from each other.

10. Apparatus as described in claim 7, wherein said biasing means includes
an arm connected to said seat and projecting transversely to said axis, and
a spring connected to said arm and to said support means, and
said damping means includes
a plurality of connections on said support means for connecting said springs at various radial distances from said axis.

11. Apparatus as described in claim 7, wherein said biasing means includes a leaf spring connected to one of said seat and said support means, the other of said seat and said support means including stops for receiving the free end of said leaf spring therebetween to permit flexing of said leaf spring without disgorging.

12. Apparatus as described in claim 11, wherein the point of connection for said leaf spring and said stops are located at the same radial distance from said axis.

13. Apparatus for inducing nystagmus in a human subject, comprising:
support means,
a seat including means for freely pivotally mounting said seat for oscillatory movement on said support means about an upwardly directed axis,
biasing means urging said seat to an at-rest position whenever said seat is pivoted in either direction therefrom, and
an electrical sensing means connected to said support means and said seat for sensing the relative positions thereof.

14. Apparatus as described in claim 13, wherein said electrical sensing means includes a potentiometer, the arm of which is fixedly positioned with respect to one of said support means and said seat and the resistor element along which said arm travels is fixedly positioned with respect to the other of said support means and said seat.

15. The method for inducing and measuring nystagmus in a human subject, which comprises:
positioning said subject in a pivotal chair biased to an at-rest position, said chair being freely pivotally mounted for oscillatory movement upon a support, said chair being fixedly secured from lateral swinging,
pivoting said chair from the at-rest position to produce alternating angular acceleration in the plane of the horizontal semicircular canals, and
measuring the amount of eye movement of the subject caused by pivotal movement of said chair.

16. The method as described in claim 15, and including the step of recording the movement of the chair through potentiometric connections, said recording being concurrent with said measurement.

17. The method as described in claim 15, and including the steps of
modifying the mass of said chair, thereby changing the radius of gyration, and
pivoting said chair from the at-rest position to again produce alternating angular acceleration in the plane of the horizontal canals.

18. The method as described in claim 15, and including the step of blindfolding the subject to exclude optokinetic stimulation.

19. The method for inducing and measuring nystagmus in a human subject, which comprises:
positioning the subject with his head bent forward approximately 30° in a pivotal chair biased to an at-rest position, said chair being freely pivotally mounted for oscillatory movement upon a support, said chair being fixedly secured from lateral swinging,
connecting sensors to the subject for nystagmographically measuring the response of the subject,
rotationally deviating the chair from its at-rest position in a first direction,
releasing the chair for damped sinusoidal harmonic type movement, counting the number of beats of nystagmus movements while the chair is rotating in said second direction for a fixed number of rotations interspersed with rotations in said first direction, counting the number of beats of nystagmus movements while the chair is rotating in said first direction for the same number of rotations as for said second direction, subtracting the smaller number of beats counted for one of said directions from the larger number of beats counted for the other of said directions, and dividing the difference in the beats by the total number thereof, a percentage of over 20 percent evidencing pathology.

20. The method as described in claim 19, the results thereof being characterized as the rotational test results, and including the step of introducing a fluid into the outer ear of the subject, and measuring differences of nystagmus movement caused by said introduction of said fluid, wherein a normal rotational test result and a disrhythmic caloric test result evidences a disturbance in the fast threshold phase mechanism of the brain stem of the subject.

21. The method for evaluating the effects of vestibular functioning in an animal, which comprises:

positioning the animal in a pivotal chair biased to an at-rest position, said chair fixedly secured from lateral swinging, pivoting said chair from the at-rest position to produce alternating angular acceleration in the plane of the horizontal semicircular canals, nystagmographically measuring the response of the subject, treating the animal with a drug having a vestibular effect, and repeating the steps of positioning, pivoting and nystagmographical measuring to determine the relative nystagmus patterns and hence the vestibular effects of said drug.

* * * * *

UNITED STATES PATENT OFFICE
CERTIFICATE OF CORRECTION

Patent No. 3,716,046            Dated February 13, 1973

Inventor(s) Charl E. Janeke

It is certified that error appears in the above-identified patent and that said Letters Patent are hereby corrected as shown below:

Columns 5 through 8 bearing patent No. 3,715,946 should be cancelled and all the matter on the attached sheets substituted therefor:

Signed and sealed this 19th day of March 1974.

(SEAL)
Attest:

EDWARD M. FLETCHER, JR.        C. MARSHALL DANN
Attesting Officer                Commissioner of Patents folded or told to keep his eyes shut to prevent optokinetic stimulation of the eyes. By moving the spring to various connections on arm 26 at connection 30 and/or by changing the position or size of weight 36, the duration of the oscillatory swing may be changed. A new test may then be run in the same manner as the first at this new oscillation damping adjustment.

An alternate embodiment to the one just described in Figure 1 is illustrated in Figure 2. Like parts are identified by the same reference numerals. In this embodiment, support 16 and seat 18 are separated by a distance that will allow the biasing leaf spring to operate in the manner to be described. A leaf spring 50 is secured at one end to the underneath side of seat 18 at a substantial radial distance from axis 24. Two receiving stops 52 and 54, affixed to the top of support 16, are located at approximately the same radial distance for receiving the other or free end of spring 50. Free end 50 has an elongate slot formed therein through which a pin 56 passes, this pin being connected to stops 52 and 54. The pin prevents leaf spring 50 from disgorging, but allows the spring to slip up and down between the stops.

Displacement of seat 18 from its at-rest position flexes the spring and moves the spring outward from between the stops. When the seat is released for swiveling, the spring causes ack and forth oscillation in the manner described for operation of the embodiment of Figure 1.

The connection and stops may be reversed as to location and the ends do not have to be at the same radial distances for successful operation.

With reference now particularly to Figures 3, 4, and of the drawings, another embodiment of the present invention is illustrated wherein apparatus for nystagmus testing is shown to include a base, illustrated generally at 70, including a plurality of foot pieces 71 supported by a plurality of floor contact pads 72. An elevated support 73 is supported above the foot pieces by a plurality of braces 74 connected to and extending upwardly from the foot pieces 71. Floor contact pads 72 may be adjustable for the purpose of stabilizing the base 70 and positioning the support 73 in generally horizontal manner.

A boss 75 may be disposed centrally of the support 73 and may define a bearing recess 76 within which is disposed an anti-friction thrust bearing 77. A chair, illustrated generally at 78, in which a patient to be tested will be seated, includes a seat portion 79 having a support 80 fixed in any desirable manner to the bottom portion thereof to define a substantially planar chair support surface disposed in angular relation with the bottom portion of the chair and thereby allowing the chair seat to be slightly inclined for the comfort of the patient being tested.

A rod or shaft 82, defining a vertical axis about which the chair is rotatable, extends through an appropriate aperture formed in the support 73 and through the bearing 77 and as provided with a support head 83 secured in any desirable manner to the support 80 in engagement with support surface 81. The lower extremity of rod 82 may extend through an aperture 84 formed in a center section 85 to which foot pieces 71 are appropriately connected. Anti-friction bearing means 86, disposed within an enlarged portion of the aperture 84, may be disposed in receiving relation with the lower extremity of rod 82 to provide for substantially friction-free rotation of rod 82 relative to the center section 85.

For the purpose of controlling oscillation of chair 78 relative to the base 70 during nystagmus testing, a bolt member 87 of considerable length may be extended through an appropriate aperture 88 formed transversely through rod 82. An adjustment nut member 89 may be received by the threaded bolt 87 and may be manually adjusted for positioning of the bolt as desired. The bolt 87 may be provided with a bifurcated extremity, such as that shown at 90 in Figure 4, through which is disposed a pivot member 91 pivotally securing a connecting link 92 to the bolt structure.

An oscillation adjustment arm 93 may be secured to support 73 in any suitable manner such as by bolts 113 in such manner as to extend outwardly from the support 73. An elongated slot 94 may be formed within the adjustment arm 93 to receive an adjustment member such as a bolt and wing nut assembly as illustrated at 95. The bolt and wing nut assembly may be received through an adjustment block 96 and may serve as a pivot to retain a pivoted spring link 97 in assembly therewith.

A tension spring member 98 may be employed for the purpose of controlling oscillation of the chair 78 and, according to the present invention, may take the form of a helical spring illustrated at 98 provided with the extremities thereof connected by conventional hook-and-eye connections to links 92 and 97.

As the chair rotates during oscillational movement about the axis defined by rod 82, the bolt structure 87 will oscillate from the neutral or full line position, illustrated in broken line. Tensioning of spring 98 may be adjusted by loosening the bolt and wing nut assembly 95 and by positioning the spring adjustment block 96 at any suitable location along adjustment arm 93 within the limits defined by the length of slot 94. If further adjustment is determined to be desirable, the adjustment nut 89 may be manually adjusted as desired to achieve appropriate positioning of the bolt 87 relative to the rotatable rod 82.

Control of gyrational movements of chair 78 may also be accomplished by suitably altering the weight of a foot-rest 99 extending outwardly and downwardly from the chair seat portion 79 thereby providing a weighted member extending outwardly from the axis rod 82 and having similar function as compared to the weights 36 and 37 illustrated in Figures 1 and 2. Depending upon the weight of the patient being tested and the particular amount of gyrational oscillation desired, the weight of foot-rest 99 may be altered in any desirable manner, such as by placing weighted plates thereon, thereby controlling the mass being oscillated about rod 82.

The particular chair structure illustrated in Figure 3 is readily adaptable to the various acceptable methods for nystagmus testing. The chair may be provided with a back rest 100 that is capable of tilting from a vertical position for caloric testing through a 45 degree position for the eye and ear methods of nystagmus testing and to a substantially horizontal position to allow the patient to be readily and easily examined by the physician with the aid of a microscope or other appropriate testing apparatus. The chair back may be conveniently positioned manually in the various suitable positions thereof or, if desired, the back rest portion 100 of chair 78 may be adjustable through the use of a motor mechanism such as an electric motor (not shown) within the scope of this invention.

For the purpose of substantially immobilizing the head of a patient being tested, an adjustable head rest 101 may be secured in any appropriate manner to the back rest 100 of chair 78 and may be provided with padded head contacting members 102 that allow the patient's head to be supported comfortably. Arm rests 103 may be secured to the seat portion of chair 78, if desired, to allow comfortable supporting of the patient's arms during the testing procedure.

As in the embodiment illustrated in Figures 1 and 2, a circular potentiometer 104 may be secured to the central portion 85 of base 70 in any desirable manner and may include a resistance element suitably supported around the rotatable rod 82. Although the potentiometer is shown to be supported below the central portion 85, it is not intended to so limit the invention, it being obvious that the potentiometer may be supported above the central portion if desired. As indicated above, the resistance element is preferably linear with distance and provides variable resistance measurements indicating the electric-sensing position determination of the chair. By providing graphic readout of measurements provided by the resistance element, it is possible to determine not only the number of chair gyrations during any particular time but also the magnitude of such chair gyrations. As illustrated schematically in Figure 3, conductors 105 and 106 extend from the potentiometer 104 to any suitable apparatus 107 for graphically representing electric signals transmitted by the potentiometer 104. Conductors 108 and 110 extend from the graph producing apparatus 107 and may be provided with terminal sensors 112 adapted to be attached to the patient being tested.

A distinct advantage of the base supported rotational chair presented in Figures 1 through 5 over a chair suspended from the ceiling is that there is no swinging motion in any lateral direction from axis 24 or 82, only circular motion thereabout.

In using the rotational chair described above in testing a subject, the subject is first seated on the seat and his head is tilted forward approximately 30 degrees. The electrodes or other sensors for electronystagmography are placed on the two temples in order to record eye movement. The ground electrode is placed on the forehead. The potentiometer connections are made to provide for simultaneous recording of the movement of the chair. Before the chair is allowed to move freely, it is brought to a position of about 90-135 degrees from the at-rest position, or the midpoint of the rotational pivot. The first displacement of the chair may be made to the left. In this way, the beats of the series of nystagmus movements during the first rotation will be directed towards the left and those of the second series towards the right, and so on, alternating to the left and to the right.

The number of the nystagmus beats to the left and to the right during the first ten rotations are then counted. The difference between the total number of beats to the left and to the right is then expressed as a percentage of the total number of provoked nystagmus beats. When the chair is allowed to move freely in the manner just described, damped sinusoidal harmonic type movements are obtained.

In addition to the test procedure just described, the chair may be tilted backwards by 45 degrees by adjusting the head rest. In this position, the subject is in a suitable position for conducting the caloric test when such test is to be performed in addition to the rotational chair test.

A horizontal nystagmus provoked by such a stimulus indicates that there is at least one horizontal semicircular canal sensitive to the horizontal plane rotation. Quantitative information thus collected can be examined for more detailed information. For example, detailed examination might reveal a symmetrical nystagmus response or a directional preponderance of nystagmus to the right or to the left. A directional preponderance of more than 20 percent indicates pathology.

If the change of speed of rotation is desired for more complete testing, this is accomplished by the setting of the biasing spring or by adjustment of the lateral weights.

The rotational chair test may be used cumulative with the caloric test. In some cases, caloric nystagmus can be suppressed by the action of higher centers in the central nervous system. The rotational chair can often precipitate latent or suppressed responses and thus provide evidence that the peripheral labyrinths are normal. An absent caloric response with a normal rotational response may indicate the phenomenon of discordance. If there is a normal rotational chair test response and a dis-rhythmic caloric test response, it indicates there is a disturbance in the fast threshold phase. This fast-phase trigger mechanism is located in the brain stem and is influenced, for example, by drugs, central vestibular pathology and the state of alertness of the subject.

Hence, the test may be used as a rapid method to investigate the sensitivity of the vestibular system or screening subjects for drunkenness, drug use, or for injury subsequent to an accident.

Further, it is a simple procedure to gain information on the vestibular functioning in children, even infants, since mothers readily hold their children in their arms while sitting in the chair.

Although the rotational chair test presents a method to evaluate the effects of vestibular functioning in humans, it also offers the opportunity to study such things as the effects of anti-motion sickness drugs in animals, as well as humans. Even repeated or prolonged tests may be performed, if desired. Since the movements provoke only a small stimulus, it has been discovered that there is no habituation. Because of this, qualitative measurements may be made to determine the drug effects on the nystagmus patterns.

Although particular embodiments of the invention have been shown, it will be understood that the invention is not limited thereto, since many modifications may be made and will become apparent to those skilled in the art.

I claim:

1. Apparatus for inducing nystagmus in a human subject, comprising:

support means,